US005439710A

United States Patent [19]

Vogt et al.

[11] Patent Number: 5,439,710

[45] Date of Patent: Aug. 8, 1995

[54] METHOD OF PRODUCING MULTILAYER COATINGS, MORE PARTICULARLY FOR LACQUERING OF MOTOR VEHICLES, HAVING GOOD ADHESION BETWEEN LAYERS

[75] Inventors: Bettina Vogt, Düsseldorf; Hans-Peter Patzschke, Wuppertal; Werner Lenhard, Wuppertal; Dietrich Saatweber, Wuppertal, all of Germany

[73] Assignee: Herberts G.m.b.H., Wuppertal, Germany

[21] Appl. No.: 171,323

[22] Filed: Dec. 21, 1993

Related U.S. Application Data

[63] Continuation of Ser. No. 959,891, Oct. 13, 1992, abandoned.

[30] Foreign Application Priority Data

Oct. 17, 1991 [DE] Germany ........................ 41 34 289.5

[51] Int. Cl.$^6$ .......................... B05D 1/36; B32B 9/04; C25D 13/00

[52] U.S. Cl. .............................. 427/407.1; 204/181.1; 204/181.7; 427/409; 427/410; 428/411.1

[58] Field of Search ..................... 427/407.1, 409, 410, 427/195; 204/181.1, 181.7; 428/411.1, 418

[56] References Cited

FOREIGN PATENT DOCUMENTS 0089741 9/1983 European Pat. Off. .
0142501 5/1977 Japan .

*Primary Examiner*—P. Achutamurthy
*Attorney, Agent, or Firm*—Richard A. Speer; Keck, Mahin & Cate

[57] ABSTRACT

A method or producing multilayer coatings, more particularly for lacquering of motor vehicles in which at least three immediately adjacent layers with alternating effective charge of the used binders are applied. The coating agents can be made polar e.g. by using resins containing ionic groups.

16 Claims, No Drawings

METHOD OF PRODUCING MULTILAYER COATINGS, MORE PARTICULARLY FOR LACQUERING OF MOTOR VEHICLES, HAVING GOOD ADHESION BETWEEN LAYERS

This is a continuation of application Ser. No. 07/959,891 ,filed on Oct. 13, 1992, now abandoned the text of which is hereby incorporated by reference.

FIELD OF THE INVENTION

The invention relates to manufacture of multilayer coatings, more particularly for lacquering of motor vehicles, having good adhesion between layers.

BACKGROUND OF THE INVENTION

Multilayer coatings are universally known in the industry. they are used for producing a lacquer structure which has various advantageous properties which cannot be obtained by using one coating agent only. In the car industry, for example, two-component stopping media or electrodeposition coating stopping media are used in order to protect the metal parts from corrosion. Fillers (primer/surfacers) are usually designed to compensate irregularities of the substrate and so obtain a smooth homogeneous surface for various kinds of substrate. They are also designed to protect the stopping medium from gravel or other mechanical damage. The top coatings normally improve the appearance of the substrate. They are single-layer or multi-layer covering (top) lacquer coatings. The multilayer top coatings comprising a pigmented base layer covered with a clear lacquer layer.

Multilayer lacquer coatings of this kind are described e.g. in EP-A-89 497. An aqueous anionic binder in a metallic base layer is applied to conventional substrates, followed by application of a normal conventional single-component (German abbreviation 1K) or two-component (2K) clear lacquer.

To improve the efficiency of a complex multilayer lacquer structure, the individual layers are usually optimised with a view to their special intended application. To obtain a good overall result, however, the successive layers must be well adapted to one another. For example, the layers must adhere very firmly to one another. More particularly, adhesion between the individual lacquer layers is required under mechanical stress, e.g., from stone chipping. Another problem, which is also connected with adhesion, is the resistance to "damp heat". It is known that under various damp storage conditions, moisture my accumulate at the interphase of individual layers multilayer systems. This results in loss of adhesion or blistering between the lacquer layers.

One possibility of improving the adhesion is to use adhesion mediators in the coating formulations. The primers can optionally diffuse into the surface later, depending on the chemical structure, and thus increase the adhesion to the next layer of lacquer. For example, DE-OS 39 32 744 describes the use of zirconaluminate compositions to improve adhesion. It is also known to use reactive adhesion mediators. These additives, however, have to be selected for each layer. Very often they have side-effects, e.g. tendency to form craters, which finally prevent a good lacquer structure being obtained.

EP-A-0 421 247 describes a process in which two electrochemically deposited lacquer layers for improving the optical properties are described. An anionic layer (ATL) is first deposited, then stoved, provided with a second layer in the form of a cathodic electrodeposition lacquer coating (KTL) and stoved. The reference mentions the corrosion resistance and the general appearance. However no subsequent coating layers are applied on the primer layers. In DE-OS 38 05 629 a stone chip resistant layer in the form of a coating agent based on an anionic binder is applied to commercial KTL. The covering layer is a commercial alkyd/melamine covering layer. The aim of this lacquer structure is to improve the protection against gravel given by aqueous anti-gravel coating agents, by using special resins. A conventional solvent-containing covering lacquer is used. The multiple coating has the usual weaknesses with regard to resistance to damp heat. All the anti-gravel layers in multilayer structures hitherto described consist of anionic binder systems.

SUMMARY OF THE INVENTION

The aim of the invention is to provide a method in which the structures of the binders in successive layers are well adapted to one another, to obtain good adhesion between the different layers and improved resistance in the humidity test.

This is achieved by the process constituting the subject of the invention, in which at least three directly adjacent layers containing resins having alternating polarity are applied in order to produce multilayer coatings.

Preferably at least four polar layers are applied, and particularly preferably the entire structure is exclusively made up of layers containing resins with opposite effective charge.

Preferably the alternating structure is counted starting from the top layer of the multilayer structure.

"Alternating polarity" means that adjacent coating agents or layers are based on resins having opposite polarity, i.e. their effective charge is opposite. The polarity is the effective total charge of the resins which is the sum of charges and partial charges. Thus, the polarity of the layers is mainly determined by the content of polymers containing polar groups, e.g. ionic groups or groups convertible into ionic groups and optionally supported by groups having a strong dipole or a high dipole moment.

Preferably the resins comprising polar groups are selected from the group of e.g. binder resins, hardeners or cross-linking agents, paste resins, rheology resins or other resin-like components of polymers optionally contained in coating agents.

In the method according to the invention, it is preferable e.g. to use "anionic" and "cationic" coating binders. The coating materials of use according to the invention are preferably water-based. Hereinafter the invention will be described mainly with respect to the aforementioned preferred examples of coating materials, but this is not a limitation.

The good stability in the damp heat test obtained by the process according to the invention is particularly surprising because the interfaces between the lacquer layers are supposed to have salt-like structures, which in general are particularly sensitive to moisture.

The anionic coating materials for use according to the invention can e.g. be coating agents comprising lacquer binders having anionic groups incorporated in the polymer skeleton or covalently attached reactive groups convertible into anionic groups. The cationic coating agents can e.g. contain lacquer binders bearing cationic groups incorporated in the polymer skeleton by a reaction, or substituents convertible into cationic groups. According to the invention, not all the resins need contain ionic groups. It is sufficient if only a part of the resins contain ionic groups. Ionic additives or ionic pigments can assist the effect according to the invention. The anionic groups or groups convertible into anionic groups can e.g. be —COOH, —$SO_3H$, —$PO_2H$, —$PO_2R(OH)$ or —$PO_3H_2$. These groups can be converted into the corresponding anions by organic or inorganic bases. The cationic groups or groups convertible thereinto can e.g. be —$NR_3+$, —NHR, —$NH_2$ or —$SR_2+$, where R denotes e.g. $C_1$ to $C_8$-alkyl. The groups can be converted into the ionic form by organic or inorganic acids or by alkylation. These ionic groups are preferably linked to the binder by covalent bonds.

As already mentioned, use can also be made of components containing groups which are strong dipoles, e.g. have high dipole moments. Examples of such groups are: hydroxyl or ether or amide or urethane or urea or ester or nitrile or nitro groups or halogen atoms (e.g. chlorine and fluorine, as in the trifluoromethyl group).

DETAILED DESCRIPTION OF THE PREFERRED EMBODIMENTS

The method according to the invention can e.g. be as follows: A coating agent containing e.g. cationic groups incorporated by a reaction is followed by a coating agent containing anionic groups and then by cationic coating. The reverse sequence is also possible; the important aspect is the alternating effective charge of the coating binders used in subsequent layers.

According to the invention, for example, the first layer may be an aqueous corrosion-protective layer which is applicable by electroopposition. For this application either anionic (ATL) or cationic (KTL) materials are available. Another example for the first coating layer is an aqueous 2K-epoxyamine primer which contains neutralised amino group-containing resins (cationic). A primer is first applied, followed e.g. by an aqueous filler layer. An anionic stopping medium is covered by a cationic filler layer whereas a cationic stopping medium is covered by an anionic filler layer. The next layer can be an aqueous pigmented lacquer, e.g. an aqueous metallic based coat. In the case of the anionic filler layer the base coat binder is cationic, whereas in the case of the cationic filler layer the base coat binder is anionic.

The next layer can e.g. be a clear lacquer coating. This as before contains ionic groups incorporated in the binders which are oppositely charged to the base coat. An anionic base lacquer is followed by a cationic clear-coat layer, whereas a cationic base coat is followed by an anionic clear-coat layer.

The following are examples of multilayer structures according to the invention:

| A) | B) |
|---|---|
| cationic stopping medium | anionic stopping medium |
| anionic filler (primer/surfacer) | cationic filler (primer/surfacer |
| cationic base coat | anionic base coat |
| anionic clear coat | cationic clear coat |
| **C)** | **D)** |
| aqueous cationic 2 K stopping medium | cationic stopping medium |

-continued

| | |
|---|---|
| anionic stone chip resistant intermediate medium | anionic filler (primer/surfacer |
| cationic top coat | cationic base coat |
| | anionic powder clear lacquer |

The above listed multilayer compositions are examples of special sequences of coating layers on the basis of binders having ionic groups. They can be altered by intermediate layers, e.g. additional anti-gravel intermediate layers or additional barrier layers or other sequences of layers. According to the invention, at least three layers based on ionic binders must be applied. Preferably the alternating structure is counted from the outermost (top) layer inwards in direction to the primer layer.

Water based coatings are preferred for environmental reasons, but it is also possible to use solvent based systems. In this case, however, the binders must have incorporated ionic groups. "Water based coating systems" are coating materials which are physically or colloidally dissolved in water or which are dispersed in water. The electric charge can be on the surfaces of colloidal or dispersed particles and can be produced by adding suitably charged emulsifiers. Binders containing ionic groups are preferred.

In aqueous systems some of the ionic groups are usually necessary for converting the binder into a water-dispersible form, whereas in the case of binders in organic solvents, the proportions of ionic groups can be smaller. Some of the ionic groups can optionally be reacted with cross-linking agents during chemical film forming, or can be expelled in the form of cleavage products from the coating film. It is sufficient if some of the ionic or ionisable groups are still present after cross-linking or drying the applied lacquer film. All polar binder systems or combinations thereof described in the literature or familiar to the expert can be used to obtain an alternating layer structure.

Examples of usable binders and coating agents will now be listed. Cathodic electrocoating systems (KTL) are described e.g. in EP-A 12 463, DE-OS 27 28 470, EP-A 82 291, EP-A 234 395, U.S. Pat. No. 4,808,658, DE-OS 27 28 470, DE-OS 36 15 810, EP-A 261 385, U.S. Pat. No. 4,865,704, EP-A 193 685, EP-A 4090, EP-A-52 831, U.S. Pat. No. 4,414,753, U.S. Pat. No. 4,496,672 and EP-A 259 181. These are coating agents which contain binders comprising incorporated cationic groups and/or groups convertible into cationic groups, e.g. —$NH_2$, —$NR_2$, —$NR_3+$, —$SR_2+$ or —$PR_3+$. The resin bases thereof are e.g. acrylate resins, epoxy resins, polyethers or diene polyhydrocarbons such as butadiene oils, polyurethanes, polyamides or polyester resins. The binders are self-cross-linking or can react via admixed cross-linking agents. The cross-linking agents can e.g. be blocked isocyanates, melamine resins, phenolic resins, transesterification hardeners, unsaturated compounds or Michael hardeners, as described in the literature. The coating agents can also contain finely-distributed cross-linked or co-reacting, optionally melting powder with or without ionic groups.

Examples of aqueous coating agents for anodic electrodeposition coating (ATL) and corresponding binders comprising anionic groups are described in EP-A 21 014, DE-OS 28 24 418, U.S. Ser. No. 72,822, U.S. Pat.

No. 4,220,568, DE-OS 27 37 174, EP-A 106 355, DE-A 27 37 174 or EP-A 21 014. The binder bases may e.g. be polyester resins, epoxy resin esters, polyurethane resins, polyacrylate resins or reaction products or maleic acid anhydride with unsaturated natural or synthetic oils, e.g. butadiene oils. The binders can be self-cross-linking or co-reacting. The groups convertible into ionic groups can e.g. be carboxyl or phosphonium groups.

EP-A-319 841, for example, describes anti-corrosion stopping media in the form of aqueous 2K systems comprising a neutralised cationic urethane amine together with epoxy resins.

DE-OS 38 05 629 or U.S. Pat. No. 4,968,536 describes examples of aqueous anti-gravel stopping media based on anionic binders. Polyacrylates, polyesters and isocyanate systems are mentioned.

Examples of aqueous fillers containing anionic binders are described in EP-A 0 272 525, DE-OS 38 05 629, U.S. Pat. No. 4,968,536, EP-A 427 028 and WO 89/00412. Polyacryl, polyesters, epoxyamine adducts, maleic acid anhydride and fatty acid reaction products or polyurethane-containing binders are described. These are cross-linked with amino resins, phenolic resins or isocyanate derivatives. Conventional pigments, fillers and lacquer additives are used.

Examples of cationic fillers are described in German patent application P 41 34 301.8 by the present applicants and having the same priority date. The fillers are coating agents containing conventional pigments, filling substances, lacquer additives and water as the solvent, and contain binders on the bases of polyacrylates, polyurethanes, polyesters or polyurethane-urea resins together with cross-linking agents based on melamine resins or blocked isocyanates. The binders contain amines and have a molecular weight between 500 and 200 000, an OH number of 10 to 400, an amine number of 20 to 200 and Tg between $-50°$ and $-100°$. The binders cross-link with the cross-linking agents via reactive NH or OH groups. Solubility in water is obtained via reactive NH or OH groups. Solubility in water is obtained via the neutralisable amino groups. The glass transition temperature (Tg) of the binders influences the elasticity thereof. The finished coating agents are applied by conventional methods, which are known to the skilled person.

Water based lacquers based on anionic binders are described e.g. in EP-A 38 127, U.S. Pat. No. 4,403,003, U.S. Pat. No. 4,539,363, EP-A 71 070, EP-A 195 931, U.S. Pat. No. 4,730,020, EP-A 238 108, EP-A-21 414, EP-A 89 497, U.S. Pat. No. 4,489,135, U.S. Pat. No. 4,558,090, EP-A 228 003, EP-A 256 540 and EP-A 260 444. The binders can be ionic microgels or co-reacting ionic polymers. The coating agents can dry under physical conditions or can optionally contain cross-linking agents or can be self-cross-linking. The binder bases are e.g. polymers of unsaturated monomers such as (meth)acrylic acid derivatives, polyesters, polyethers, polyurethanes or epoxy resin reaction products, as described.

Examples of cationic water-based lacquers are described in DE patent application 40 11 633. The substances are binders based on polyurethanes, polyesters, polyurethane-urea resins or polymers of unsaturated monomers such as (meth)acrylic acid derivatives containing amino groups instead of free carboxyl groups. Base lacquers can be formulated from these binders by adding neutralising agents or pigments, fillers, catalysts and/or additives. The binders can optionally be cross-linked via known amine formaldehyde resins or blocked isocyanates. These base lacquers can be applied by conventional techniques. Binders for water-based lacquers, if they have good resistance to weathering, can also be converted into covering lacquer coatings. However, it is necessary to choose binder systems which can be cross-linked with one another by a chemical reaction. No additional clear lacquer coating need be applied for this purpose.

Examples of water-dilutable clear lacquers containing anionic groups are described in DE-OS 39 10 829, U.S. Pat. No. 5,015,688, DE-OS 25 57 434, U.S. Pat. No. 3,953,643, DE-OS 37 12 442 or DE-OS 40 27 594. The substances are preferably carboxyl group-containing polymers based on polyesters, polyacrylates or polyurethanes and reacting with known cross-linking agents, optionally after heating, to from the clear lacquer coatings.

Examples of cationic clear lacquers are described in German application P 41 34 290.9 by the same applicants and having the same priority date. They are formulated on the basis of polymers of unsaturated monomers, e.g. acrylate resins. The binders must contain basic groups for covering into cationic groups. The properties of the lacquer can be adjusted via the molecular weight, glass transition temperature and the viscosity of the binders. the binders become cross-linked via incorporated functional groups, e.g. OH groups, using blocked isocyanates or melamine resins as the cross-linking agents.

Examples of powder clear lacquer binders containing ionic groups are mentioned in U.S. Pat. Nos. 3,787,521, 4,091,048, DE-OS 24 41 753 or DE-OS 25 09 410. The substances are e.g. acrylate resins containing epoxy groups in the side chain. These react, when melted, e.g. with polycarboxyl group-containing polymers or anhydride group-containing substances to form ester structures. Alternatively other cross-linking groups can be used, e.g. primary OH groups. Even after cross-linking, the films still contain polar groups such as COOH or OH groups.

The binders and coating agents listed hereinbefore by way of example can contain conventional pigments, catalysts or other auxiliary agents and additives. They are used for obtaining optical or technological effects or influence the properties during application. The effect according to the invention is not substantially influenced, or may even be intensified, by the additional constituents.

In one preferred embodiment, carboxyl group-containing powder lacquers are used as the clear lacquer coating. It is also preferred to use cationic water-clear lacquers. It is also preferred to use cationic water-based lacquers in the multilayer lacquer coating.

Some particularly preferred embodiments are multilayer structures consisting of an aqueous anionic clear coat based on acrylic/melamine resin or acrylic/isocyanate, applied on a cationic water-based lacquer based on aminopolyurethanes or aminoacrylate resins including an aqueous anionic filler (primer/surfacer) based on polyesters or epoxidised/urethanised alkyd resins. Another example for a multilayer structure of the invention consists of a cationic water-clear lacquer based on aminoacrylate resin or aminopolyurethane, applied on an anionic water-based base coat layer on the basis of acrylated polyester resins and/or polyurethane resins, applied on an aqueous cationic filler (primer/surfacer) based on amino epoxy resin.

The coatings manufactured according to the invention are applied in known manner, e.g. by painting, dipping, electrodeposition coating or spraying. For applying, the coating agents are adjusted to a suitable viscosity and a suitable solid content. The individual lacquer layers are cross-linked according to common principles of the prior art, i.e. optionally at elevated temperature or at room temperature, or the lacquer layers are applied wet-in-wet and stoved together. The coating agents can either dry under physical conditions and/or can be chemically cross-linked. They can be pigmented or non-pigmented when used. They can be formulated on the basis of one-component or two-component systems.

The layer thicknesses are preferably <40 μm for the stopping medium, <130 μm for the filler, <25 μm for the base lacquer and <100 μm for the clear lacquer. Other additional coating layers, e.g. anti-gravel coating agents or adhesive stopping media, can be applied for their respective purposes.

The layer having direct contact with the substrate must be adapted to the properties of the substrate, e.g. by adding adhesive mediators (frequently necessary in plastics lacquers) or via their composition. For example, binders containing anionic groups are particularly suitable for electrophoretic aluminum coating. The multilayer coatings according to the invention, irrespective of their other properties, have good adhesion between layers. This is particularly noticeable in gravel tests or adhesion tests (e.g. criss-cross cut to DIN 53151) and in stability tests under constant air conditions (e.g. DIN 50017).

The coating systems are preferably water-based. Alternatively, individual lacquer layers can contain solvents and be formulated with a high solid content or can be solvent-free systems. In this case also, however, care must be taken that at least parts of the resins, e.g. the binders, carry polar, optionally ionic, groups incorporated by a reaction. Optionally, two-component coating agents can also be used.

The aforementioned multilayer lacquers are particularly suitable for use on cars or in the car ancillary industries. Other articles can be coated correspondingly. The substrates can be all those conventionally used in the car industry, e.g. metal substrates such as steel or aluminum or plastics substrates such as steel or aluminum or plastics substrates, e.g. polyurethane, polyamide, polycarbonate or polyolefins. The resulting multilayer coatings are gravel-resistant and have a good appearance.

EXAMPLES

In the multilayer structures described hereinafter, the individual coating agents used were as follows:

A) Commercially available coating agents for cataphoretic electrodeposition coating based on amino-epoxy resin and blocked isocyanate hardeners as described in DE-A-27 01 002.

B) Anionic hydrofillers (DE-OS 38 05 629, Example 1): aqueous lacquer based on an amine-neutralised polyester using blocked polyisocyanate as a hardener.

C) Anionic water-based lacquer (EP-A-89 497, Example 6): aqueous coating agent based on anionic polyurethane dispersions in combination with acrylated polyesters.

D) Cationic water-based lacquer (DE-OS 40 11 623, Example 1): aqueous coating agent based on amino acrylates as described hereinafter.

E) Anionic water-clear lacquer (DE-OS 39 10 829, Example 3): aqueous covering lacquer based on hydroxy-functional acrylate comprising cross-linking agents in the form of neutralised carboxylic acid groups and melamine resin.

F) Anionic conventional 1K clear lacquer (commercial product): conventional clear lacquer based on carboxyl-functional and hydroxy-functional acrylate with melamine resin cross-linking agent.

Example of manufacture 1 (amino-poly(meth)acrylate resin)

725 g of butoxyethanol were heated to 110° under inert gas, using a reflux condenser.

A mixture of 192 g hydroxyethyl acrylate, 137 g butanediol monoacrylate, 228 g glycidyl methacrylate, 364 g 2-ethyl hexyl acrylate 439 g butyl methacrylate, 438 g methyl methacrylate, 90 g styrene and 44 g azo-bis-isobutyronitrile were added within 3 hours. The mixture was then left at 110° C. for 1 hour, 6 g of azo-bis-isobutyronitrile was added and the process was repeated after another hour. After 3 hours at 110° C., the measured content of solids was 72.2 wt. % and after dilution to 60 wt. % with butoxyethanol the measured viscosity was 2.14 Pa.s at 25° C. After cooling to 50° C, a mixture of 120 g diethylamine and 201 g isopropanol was quickly added (1.10 mol amine to 1.00 mol epoxide). After 30 minutes the mixture was heated to 65° C., kept at that temperature for 2 hours, then heated to 105° to 110° C. and kept at that temperature for 3 hours. After cooling to 80° C., the isopropanol and excess amine were carefully distilled off in vacuo. The content of solids was adjusted to about 78 wt. % with butoxyethanol.

Fundamental characteristics:

Non-volatile content: 78.7 wt. % (30 minutes' heating to 150° C.)

Amine value: 45 mg KOH per g solid resin

Viscosity: 3.44 Pa.s. (60 wt. % in butoxyethanol at 25° C.).

Example D (cationic water-base lacquer)

555 g of titanium dioxide were added to 945 g of amino-poly (meth)acrylate resin as per Example of manufacture 1 and dispersed in the dissolver for 5 minutes. The paste was then ground in a pearl mill at temperatures up to 60° C. for 40 minutes.

Solids: 86.6 wt. % (after 30 minutes' heating to 150° C.)

Pigment-binder ratio=0.75:1.

772 g of the paste was thoroughly agitated in the dissolver together with 111 g higher-molecular melamine resin (80% dissolved in isobutanol) containing higher-molecular methoxyimino groups and a catalyst in the form of 17.7 g of an amine-blocked sulphonic acid (25%). The mixture was then further diluted in the dissolver with vigorous agitation, first with 7.6 g of formic acid (85%) and then slowly with 142 g of completely demineralised water. After standing overnight, 100 g of the lacquer was adjusted to a spray viscosity of 30 seconds with 62 g completely demineralised water in a flow cup (DIN 53211).

Example of manufacture 2 (polyester oligomers)

336.7 g trimethylol propane, 366.8 g adipic acid and 297 g hexanediol were esterified to an acid number of 20 in the melt at 180° C. to 230° C. in a 2-liter three-necked flask provided with an agitator, separator, thermometer and reflux condenser. The mixture was then condensed in vacuo to an acid number < 1.5. The resulting product had a stoving residue of 94.5% (1 hour, 150° C.) a viscosity of 3200 mPas (100%), a hydroxyl number of 460 and a colour index of 30 Hazen.

Example of manufacture 3 (polyester oligomer polyacrylates)

717 g of polyester oligomer from Example 2 was reflux-heated to 81° C. with 597 g ethanol in a 4-liter three-necked flask equipped with an agitator, reflux condenser, dropping funnel and thermometer. Next, a mixture of 552 g butanediol monoacrylate, 996 g tert. butyl acrylate, 74 g acrylic acid and 50 g of 2, 2-azo-bis-2-methyl butyronitrile was added dropwise in 4 hours and additionally polymerised for a further 4 hours.

The product had a stoving residue of 79.8% (1 h, 150° C.) at a viscosity of 7200 mPas (DIN 53015), an acid number of 26.3, an OH number of 231 and a colour index of 60 Hazen.

Example of manufacture 4

717 g of the oligomer in Example 1 and 311 g butoxyethanol were placed in a 4-liter three-necked flask equipped with agitator, reflux condenser, dropping funnel and thermometer and heated to 140° C. Next, a mixture of 552 g butanediol monoacrylate, 946 g tert.-butyl acrylate, 74 g acrylic acid and 100 g Trigonox C (tert.-butyl perbenzoate) was added dropwise in 4 hours and polymerised for an additional 4 hours.

The product had a stoving residue of 84.0% (1 hour, 150° C.) as per DIN 53182, a viscosity of 15830 mPas (DIN 53015), an acid number of 38.0 (DIN 53402), an OH number of 231 (DIN 53240) and a colour coefficient of 60 Hazen (DIN 53409).

Example E 1 (anionic water-clear lacquer)

651 g of the polyester oligomer polyacrylate 1 described in Example 3, 348 g of a high imino-functional melamine resin and 152.8 g ethanol were thoroughly pre-mixed in a laboratory agitator and a mixture of 50.7 g butoxyethanol, 20.7 g of a benzotriazole-type UV absorber and 13.7 g of a HALS-type radical-trapping agent were added with further agitation. The mixture was then agitated and neutralised with 27 g dimethyl ethanolamine, agitated for a further 15 minutes and then diluted with a mixture of 973 g completely demineralised water and 15.4 g ethanol. The lacquer had a viscosity of 31 seconds (measured in a DIN-4 beaker at 20° C.) and a pH of 9.0.

Example E 2

639.7 of the resin solution described in Example 4 was homogeneously mixed in a high-speed agitator with 375.3 g of a commercial water-dilutable melamine resin containing methoxymethyl imino groups and 90.5 g butoxyethanol. Next, 37.6 g dimethyl ethanolamine was added to the resin and solvent mixture and agitated for 15 minutes. A further 37.27 g of a mixture of 59.9 wt. % of a benzotriazole-type UV absorber and 40.1 wt. % of a HALS-type radical-trapping agent were added and the mixture was agitated until clear and free from streaks. Next, 534.1 g of completely demineralised water was added with agitation within 5 minutes. After 24 hours the lacquer had a viscosity of 50 seconds (DIN 4 beaker at 20° C.) and a pH of 8.6. The lacquer was stable in storage for more than 3 months.

In order to apply the individual lacquer layers to the substrate, the lacquer was adjusted with completely demineralised water or solvent to the viscosity for processing and applied by the usual techniques.

The stopping medium was applied eclectrophoretically and the remaining layers were applied by a spray robot. Alternatively they can be applied by means of other equipment such as flowbeaker pistols, a pressure vessel or high-rotation bells. The layers were then stoved as described in Table 1. The KTL and fillers were stoved individually after application, whereas the base layer and the clear lacquer layer were applied wet-in-wet as follows:

The base lacquer was pre-dried at 80° C. for 6 minutes and then covered with about 40 μm of water-clear lacquer. The lacquer was pre-gelled at 80° C. for 15 minutes, after which the two layers were stoved together at 120° C. for 20 minutes.

TABLE 1

| | KTL | Filler | Base lacquer | Clear lacquer |
|---|---|---|---|---|
| Stoving temperature 1) | 30' 180° C. | 20' 160° C. | 6' 80° C. | 20' 120° C. |
| Layer thickness 2) | 20 + 1 | 35 + 1 | 15 + 1 | 40 + 1 |

1) In minutes and °C.
2) In μm

The previously-described coating agents A to F were used to produce various multilayer structures. The structures are listed in Table 2. Examples 3 and 4 are according to the invention.

The following technological test results for adhesion are given: the criss-cross cut (2 mm) to DIN 53151 and the mechanical stress test using the VDA gravel-testing apparatus (1 bar, 1000 g) to DIN 53230. The evaluation scale is from 1 to 6, 1 denoting a very good and 6 denoting a very poor adhesive connection. The products were stored to DIN 50017 under constant air conditions (240 h, 40° C.) in order to describe the damp-heat box stress, i.e. to evaluate the swelling and possibility of regeneration.

TABLE 2

| Structures | No. 1 | No. 2 | No. 3 | No.4 |
|---|---|---|---|---|
| Stopping medium | A | A | A | A |
| Filler | B | B | B | B |
| Base lacquer | C | C | D | D |
| Clear lacquer | F | E | F | E |
| Test Data | | | | |
| Criss-cross cut 2 mm (DIN 53151) | 2 | 2 | 1–2 | 0–1 |
| Gravel DIN 53230 bar, 1000 g VDA | 3 | 3 | 2 | 1–2 |
| Humidity Test DIN 50017 | | | | |
| 1. Swelling | Large blisters >80 μm Considerable swelling | Considerable swelling, change in shade of color | Small blisters <40 μm Slight surface swelling | No blisters slight surface swelling |
| 2. Regeneration in: | 24 h | useless >24 h | 3–4 h | 1–2 h |

What is claimed is:

1. A method of manufacturing a multilayer coating by applying a number of coating layers based on organic resins in succession to a substrate for coating, characterized in that at least three layers are applied on top of each other, each of said layers including resins having polar groups, the polarity of the polar groups of the resins within each said layer being the same and each said layer containing polar groups of opposite polarity to a next said layer, resulting in a layer structure having resin layers of alternating polarity.

2. A method according to claim 1, characterized in that at least four layers with alternating polarity are applied.

3. A method according to claim 1, characterized in that the layers with alternating polarity are counted starting from the top layer of the multilayer coating.

4. A method according to claim 1, characterized in that the polar groups are ionic groups or groups convertible into ionic groups and/or groups with a strong dipole.

5. A method according to any one of the preceding claims, characterized in that the resins are selected from the group consisting of binder resins, hardener resins, paste resins and rheology resins.

6. A method according to claim 1, characterized in that at least one layer based on a water based coating agent is used in the layer structure.

7. A method according to claim 6, characterized in that water based coating agents are used in at least two layers of the layer structure.

8. A method according to claim 1, characterized in that only water based coating agents are used in the layer structure.

9. A method according to any one of claims 6 to 8, characterized in that the water based coating agents contain resins having ionic groups.

10. A method according to claim 1, characterized in that layers having alternating polarity comprise a base lacquer layer covered by a clear lacquer layer, the base lacquer layer optionally being formed on a filler layer.

11. A method according to claim 10, characterized in that the clear lacquer is a powder lacquer.

12. A method according to claim 10, characterized in that the clear lacquer contains a resin comprising cationic groups.

13. A method according to any one of the claims 10 to 12, characterized in that the base lacquer layer contains a resin comprising cationic groups.

14. A method according to claim 10, wherein said filler contains a resin comprising cationic groups.

15. A method according to claim 1, characterized in that the substrate comprises outer surface parts of a motor vehicle.

16. A multilayer coating on a substrate produced by a method according to claim 1.

* * * * *